Feb. 6, 1945. C. R. GASKELL ET AL 2,368,656
NONFERROUS PROPELLER BLADE RETENTION
Filed April 14, 1943  5 Sheets-Sheet 2
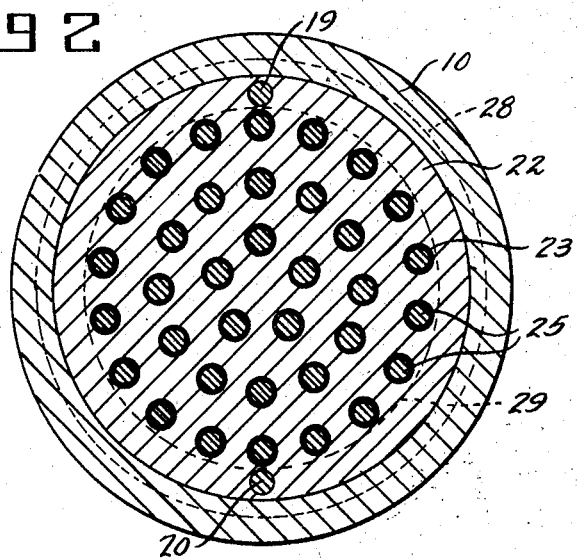
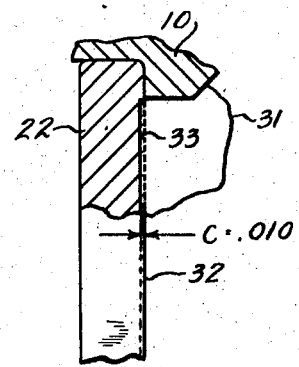
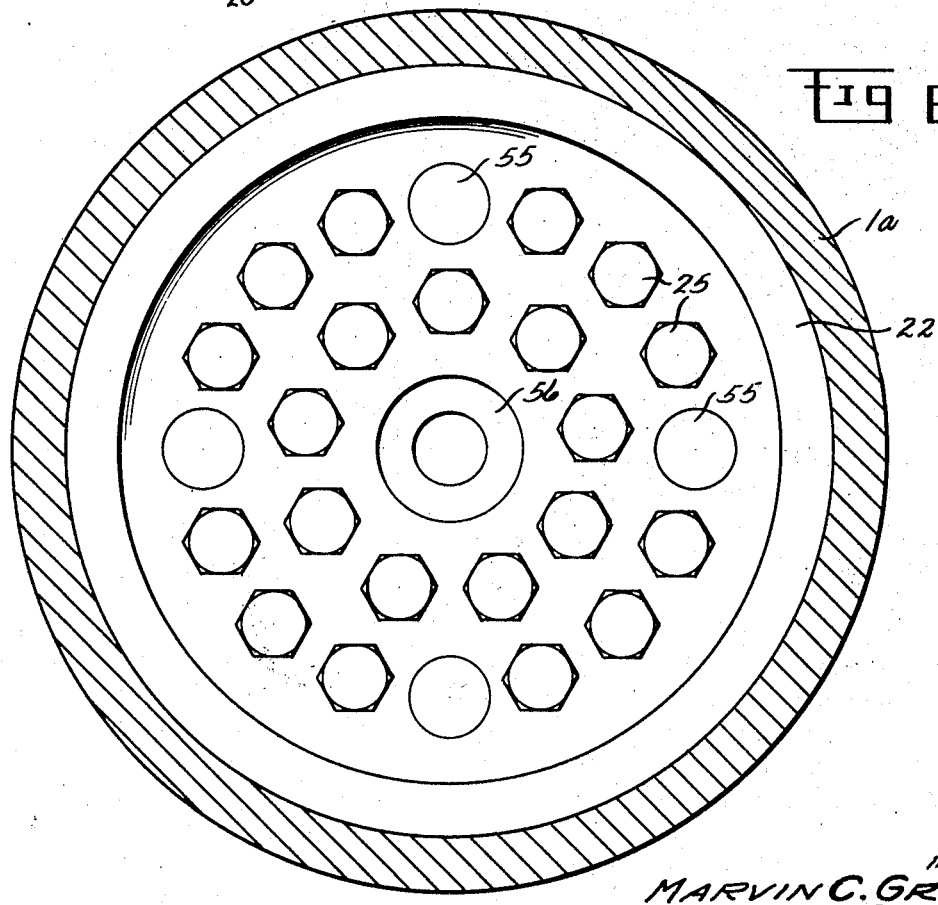
INVENTORS
MARVIN C. GREEN
CLIFFORD R. GASKELL

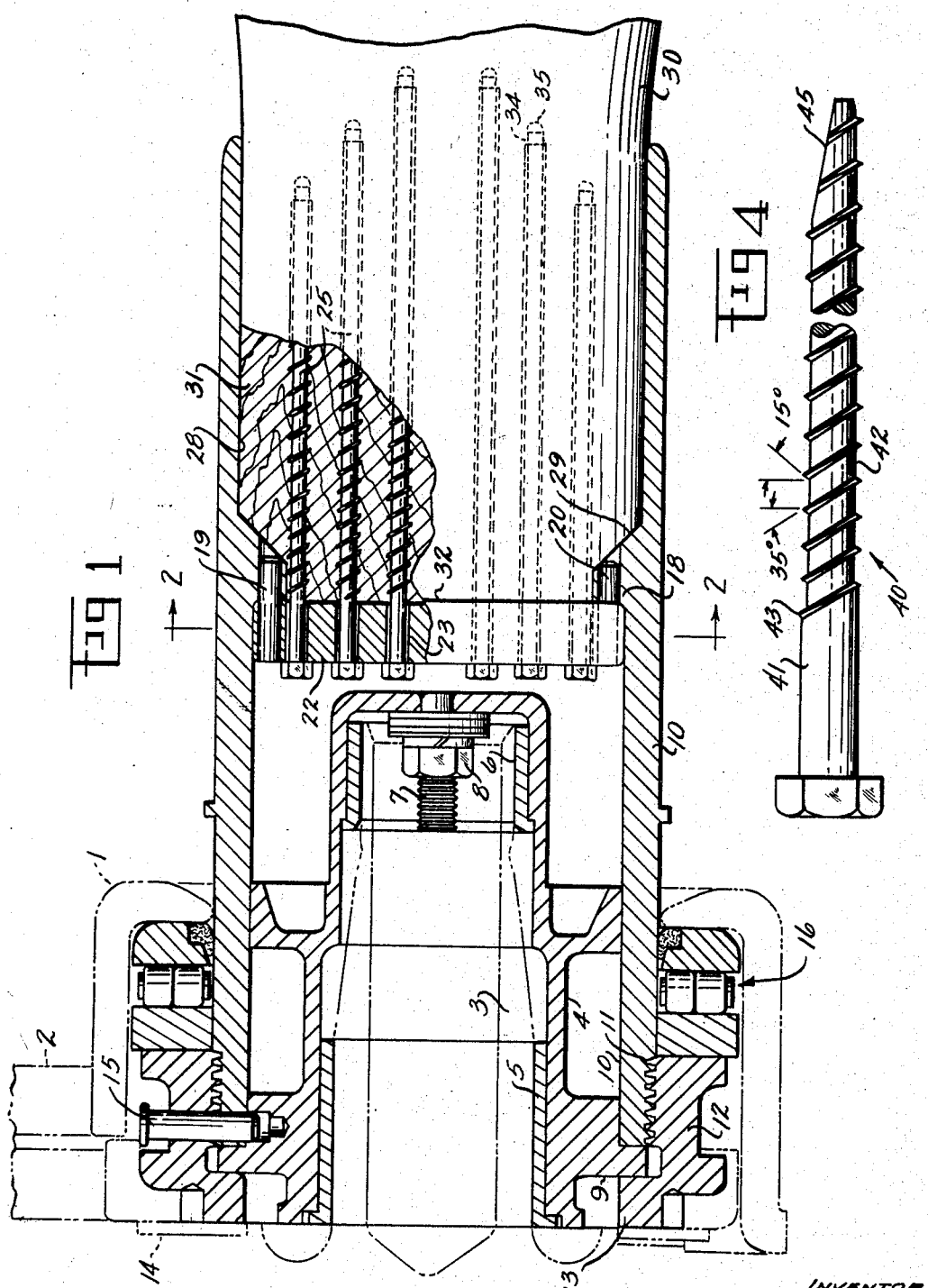

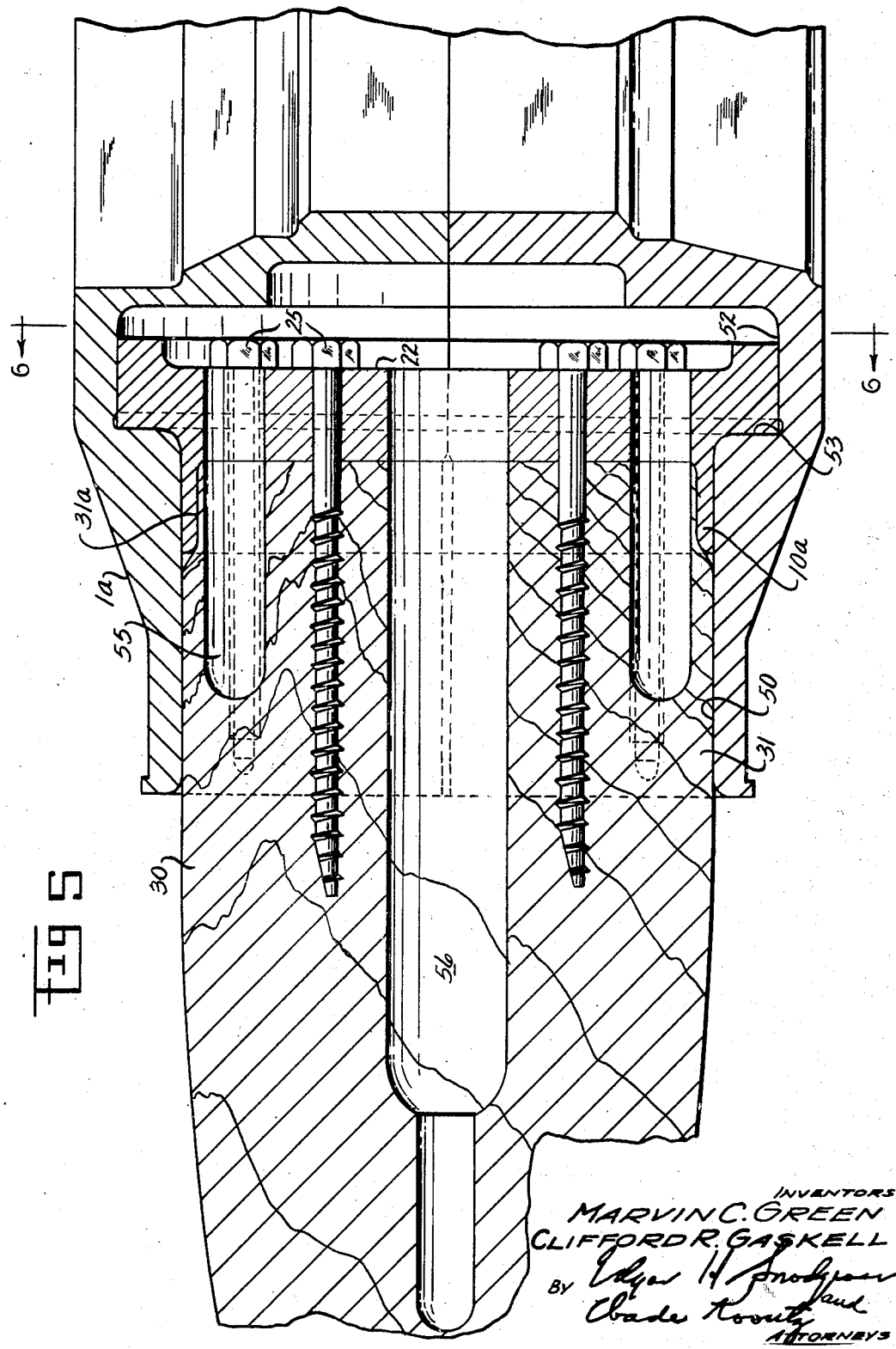

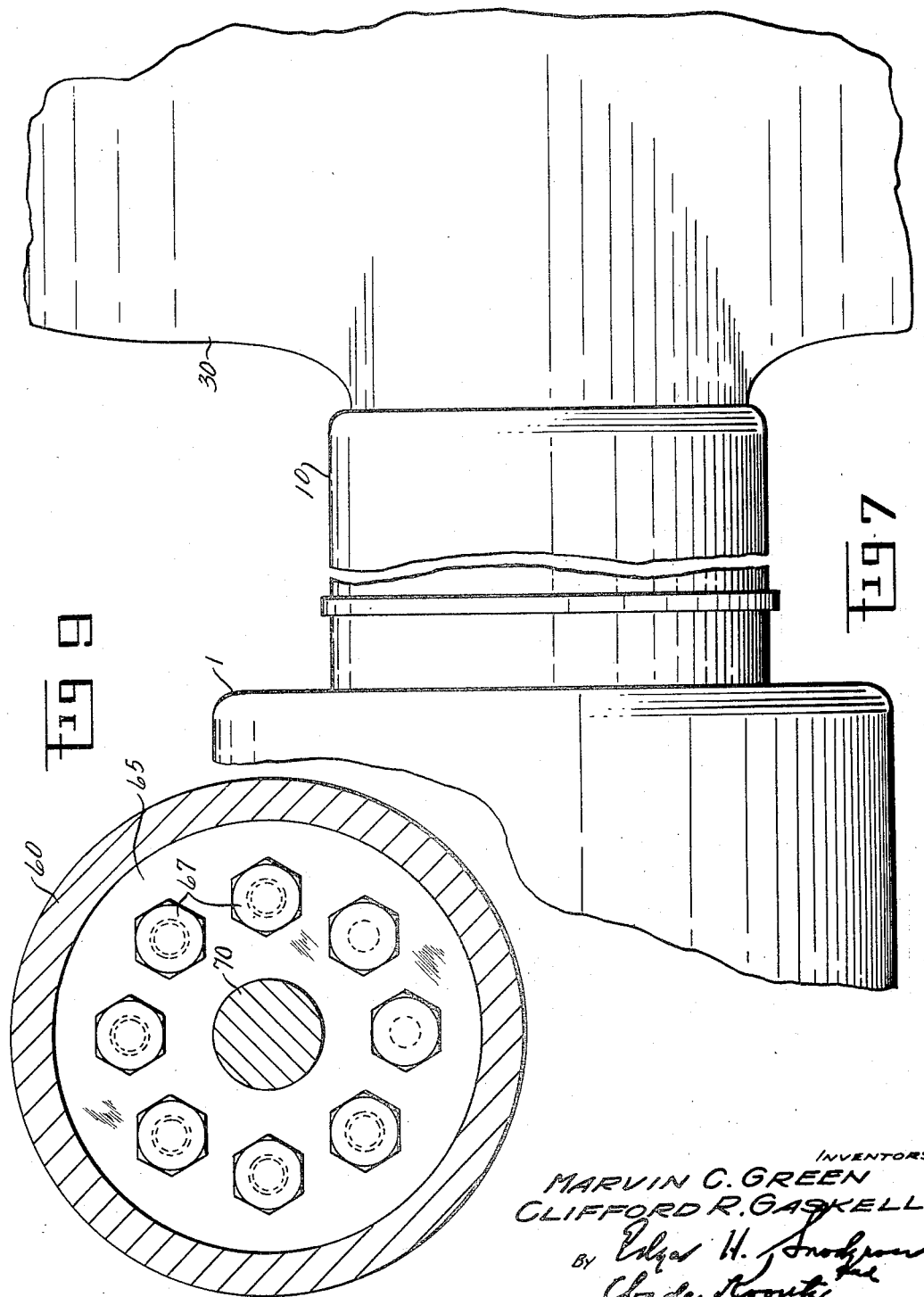

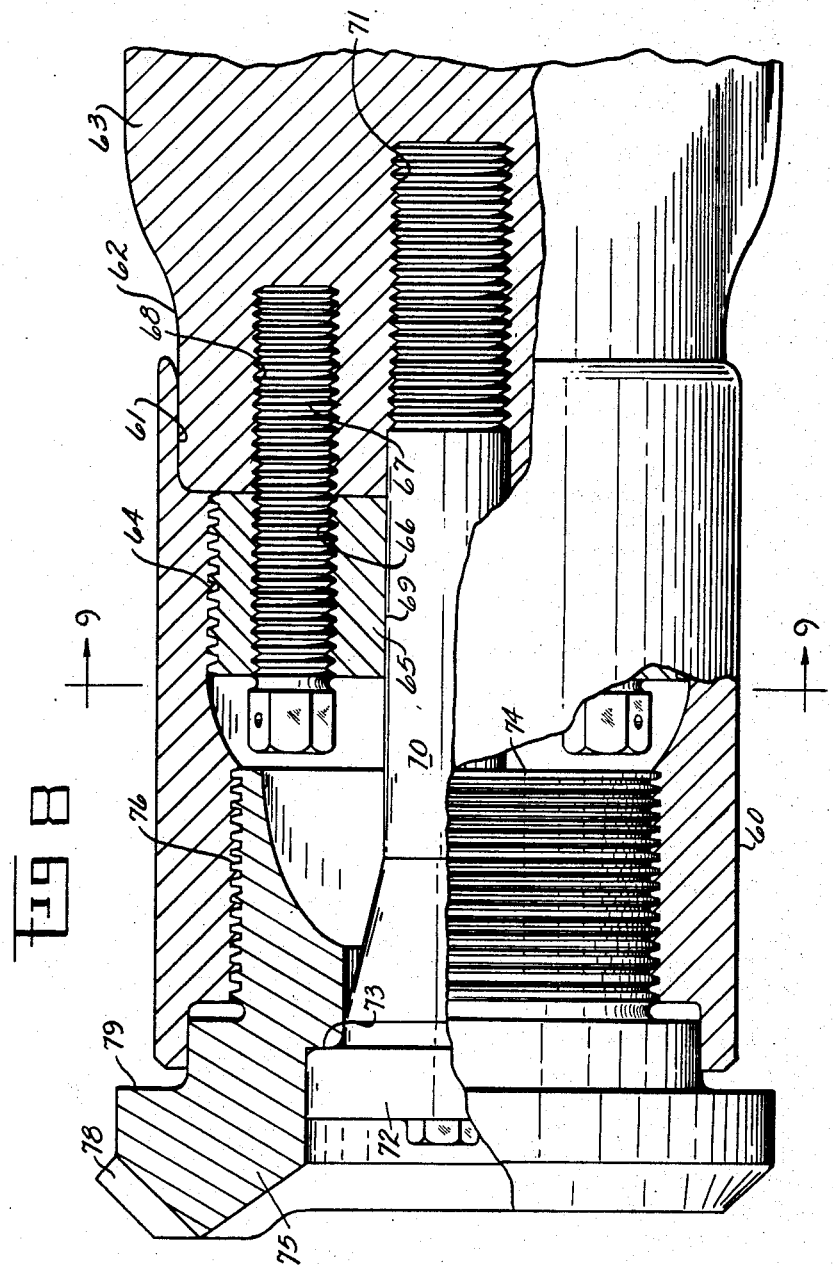

Patented Feb. 6, 1945

2,368,656

UNITED STATES PATENT OFFICE 2,368,656

NONFERROUS PROPELLER BLADE RETENTION

Clifford R. Gaskell and Marvin C. Green, Dayton, Ohio

Application April 14, 1943, Serial No. 483,006

5 Claims. (Cl. 170—173)

(Granted under the act of March 3, 1883, as amended April 30, 1928; 370 O. G. 757)

The invention described herein may be manufactured and used by or for the Government for governmental purposes, without the payment to us of any royalty thereon.

This invention relates to improvements in the retention of propeller blades in the propeller hub and while not limited in its application, is adapted for use in connection with blades made of aluminum or magnesium alloy and more particularly with blades made of wood, compressed wood, laminated wood or plastic materials.

For certain aircraft propeller applications wood, or reinforced wood blades have many advantages, but where such blades are required to be separately attached to a hub structure, a great amount of difficulty has been encountered in devising means for anchoring the blade shanks into the hubs. The difficulty has arisen because of the low shear strength and high notch sensitivity of wood and similar materials and it has been customary to increase the diameter of the shank of the blade to increase the shear area, and hence, in general, the blades are not interchangeable with metal blades.

It has been proposed in the art to imbed tension rods of steel or the like in a wood or plastic propeller blade, centrifugal stresses in the blade being transmitted to the rods by bearing washers or the like imbedded in the blade, but this proposal raises many constructional difficulties and because of the low bearing strength of wood would require a large number of rods which would seriously interfere with the tensile strength of the blade.

It has also been proposed in British Patent 512,152 to Jablonsky to secure blades made of wood to the propeller hub structure by means of screws passing through a shallow socket-like mounting on the hub and secured into the wood at an angle such that the axes of the screws lie on the sides of a cone having its apex located on the longitudinal axis of the blade. This construction, while an advance over prior proposals, is limited to a single circle of screws in order to avoid piercing the outer fibres and further, the screws must be of large diameter in order to resist the shear and bending stresses exerted thereon which lowers the joint efficiency in terms of the tensile strength of the root of the blade.

It has further been proposed in the prior art to externally thread the shanks of wooden propeller blades and force each blade into a correspondingly threaded ferrule and to rely upon the external threads on the blade shank for transmitting the blade stresses into the ferrule and from thence to the propeller hub structure. Innumerable attempts along this line have been made, and in some of which the plane of portions of the threads have been offset to further increase the area of shear in the wood, but the difficulty encountered with such a structure has been that it is very difficult to maintain machining tolerances sufficiently low to effect uniform bearing on all contact areas to insure a tight fit between the threads in the wood blade and the metal ferrule particularly at low temperatures and further the shear area in the blade material is very limited such that it is impossible to develop shear stresses in the blade attachment means anywhere near approaching the ultimate tensile strength of the blade shank, and from tests made by the applicants, blade retaining means in accordance with the invention, having blade shanks of considerably smaller diameter than employed in threaded ferrule constructions of which we are aware, have developed more than twice the ultimate strength of such threaded ferrule constructions.

In accordance with the present invention, screws threaded into the shank of the blade and arranged in substantially concentric circles transmit the tension stresses in the blade, due to centrifugal force, to a mounting plate which is integral with or secured to the propeller hub structure. The blades are socketed in the hub structure and secured in ferrules by a press fit, which ferrules transmit a major part of the bending stresses into the hub structure. By use of a large number of screws it becomes possible to secure a very large area of the wood in shear and the shear stress per screw may be made to equal the tensile strength of the screw. The screws are arranged so that their axes are parallel with or slightly inclined to the longitudinal axis of the blade and are so arranged that a substantial part of the tensile stresses are taken through material at the center of the blade shank thus greatly increasing the ability of the blade to withstand fatigue stresses.

Blade retention in accordance with the present invention makes it possible to construct propeller blades of wood, compressed wood, or plastic materials which can be used to replace aluminum alloy or steel propeller blades without changing the existing hub structure.

It is therefore an object of the invention to provide a novel means for retaining a non-ferrous propeller blade in a propeller hub by means of screws threaded into the propeller blade shank along axes substantially parallel with the longitudinal axis of the blade, and having means for transmitting tension stress from the screws to the hub structure.

It is a further object of the invention to secure a non-ferrous propeller blade into a propeller hub structure having a blade socket, by providing a plurality of screws extending into the blade shank substantially parallel with the blade axis, the screws transmitting tensile stress from the blade to the hub, and providing means such as a ferrule pressed on the blade shank, or by direct engagement of the blade shank with the hub socket, for transmitting bending stresses from the blades to the hub structure.

It is a further object of the invention to provide a propeller blade retaining means of the character described, including screws threaded into the shank of the blade along axes substantially parallel with the longitudinal axis of the blade and the screws transmitting tensile stresses from the blade to the hub structure, and means being provided for preloading the screws such that the distribution of tensile loading among the screws will not be appreciably changed by deformations of the component parts of the retention means when normal blade loading is applied, and further to ensure that the blade material will engage the screw threads throughout their length on the sides of the thread which transmit the loads from the blade to the screws.

Other objects and features of the invention will become apparent by reference to the detailed description hereinafter given and to the appended drawings in which:

Figure 1 is a fragmentary top plan view in section, of the application of the invention to a two-blade two-position, controllable pitch propeller;

Figure 2 is a view taken on line 2—2 of Figure 1;

Figure 3 is a fragmentary sectional view illustrating to an exaggerated scale the clearance provisions for preloading the blade retaining screws;

Figure 4 illustrates to an enlarged scale the details of a self-tapping screw which is of general application, but particularly adapted for use in the invention with respect to its use with propeller blades made of compressed or synthetic resin treated wood;

Figure 5 illustrates the application of the invention to a conventional type two-blade adjustable pitch propeller;

Figure 6 is a view taken on line 6—6 of Figure 5;

Figure 7 is a view of a construction similar to Figure 1, showing the manner in which the propeller blade airfoil section is continued into the propeller hub;

Figure 8 is a sectional view illustrating the application of the invention to retaining aluminum alloy blades, and;

Figure 9 is a view taken on line 9—9 of Figure 8.

Referring now to Figure 1, the reference numeral 1 indicates a conventional propeller hub of the character such as employed in the well-known Hamilton Standard two-position controllable pitch propeller in which counterweights 2 are effective to vary the pitch of the propeller blades in one direction and hydraulic fluid pressure means including a piston member (not shown) operatively connected to the counterweight is effective for changing the pitch of the blades in the opposite direction. Since the construction of such propeller pitch changing mechanism is well known in the art, the hub structure has merely been indicated by phantom lines. A central spider 3 also shown in phantom outline is employed to transmit the torque from the engine crankshaft to the propeller. The above structure being old in the art, and since the present invention relates to a means for securing propeller blades into the hub structure or the like, only those parts more immediately concerned with the invention have been shown in full lines and will now be described.

A sleeve 4 having bearings 5 and 6 is mounted on the spider 3 so that torque is transmitted from the spider to the sleeve 4, the sleeve being closed at its outer end to prevent leakage of oil from the hydraulic mechanism and is provided with the conventional inwardly directed threaded stud 7, on which is adjustably threaded a nut 8 for adjusting the balance of the propeller assembly. The sleeve 4 at its inner end is provided with an annular flange portion 9 which abuts the inner end of a tubular ferrule 10 which is threaded at 11 to receive a clamping nut 12, the latter having a lip portion 13 adapted to engage the upper side of the flange 9 and retain the sleeve 4 in fixed relation with respect to the ferrule 10 and nut 12. A conventional ring member 14 shown in phantom, interconnects the counterweight 2 to the nut member 12 and is adjustable about the longitudinal axis of the propeller and fixed by means of taper pins, and serves to transmit turning torque from the counterweight or hydraulic fluid pressure actuated means to the nut 12 and sleeve 4, the sleeve, ferrule and nut being further securely locked by means of a plurality of taper pins such as indicated at 15. A thrust bearing generally indicated by the reference numeral 16 is interposed between the bottom of the nut 12 and the inner face of the hub 1 and serves to transmit centrifugal tension from the propeller blades through the ferrule 10 into the hub structure.

The ferrule 10, midway between its ends, is provided with an inwardly projecting annular flange 18 through which a plurality of locating pins such as 19 and 20 project, which pins serve to angularly locate a disk-like plate member 22 which abuts the end face of the annular flange 18, the plate member 22 preferably being brazed into place to form a permanent assembly after the same has been properly located with respect to the ferrule 10. The plate member 22 is pierced by a plurality of clearance holes 23 arranged in the form of concentric circles (see Fig. 2) and through which respectively pass a number of screws 25, which are screwed into the shank of the propeller blade to secure the same into the ferrule. The ferrule 10 at its outer end is counterbored as at 28 to form a socket which is provided with a conical seat as at 29 so as to receive the circular shank 31 of a propeller blade 30 which may be constructed for example of laminated wood, synthetic resin-impregnated compressed wood known in the art as Compreg, or impregnated fabric known as Micarta, or other similar compositions.

The shank 31 of the propeller blade is pressed into the counterbore or socket 28 in the ferrule 10 such that a considerable radial stress is exerted on the blade shank, and this serves to transmit bending loads from the propeller blade into the ferrule, from whence the same are transmitted into the hub structure through the thrust bearing. The inner end face 32 of the blade shank 31 abuts the plate member 22 with the exception of the clearance space 33 (note Fig. 3) which is provided by recessing the face of the plate member 22. The shank of the propeller blade is jig drilled tapping size as indicated at 34 for each of the respective screws 25 and the bottom of each of the drilled holes is rounded as at 35 to prevent the concentration of stress. The screws 25 which are preferably of the self-tapping type are screwed into the holes 34 after the blade has been pressed into the ferrule socket 28 and the screws are drawn up until the respective screws have received a predetermined tensile preload, measured for example by a torque indicating wrench. When a tensile load is applied to a blade with retention means as shown in Figure 1 there is a tendency for the deformation of the plate member 22 to cause the screws near the axis of the blade to carry less load than the screws near the periphery of the plate. A predetermined load distribution among the screws can be effected by causing an initial deformation of the plate member 22 which is accomplished by preloading the screws; that is, the screws are drawn up to a total tensile load near the normal tensile loading of the blade which causes plate 22 to deflect into the clearance space 33. As the screws are tapped into the material of the blade, they have a tendency to bear on the outer face of the threads and in order to insure that the screw threads will be in contact on their inner faces with the material of the blade shank throughout their length, it is necessary to preload the screws, which is accomplished by means of the clearance space 33 previously noted; that is, as the screws are tightened the wood in the blade shank is elongated and this insures that the threads of the respective screws will be in contact throughout their length with the material of the blade shank. The amount of clearance 33 is generally of the order of about ten one-thousandths of an inch.

It will be noted by reference to Figure 2 that the screws 25 are arranged in concentric circles, and by reference to Figure 1 it will be noted that the length of the screws in the respective screw circles decrease from the center outward; that is, the length of each respective circle of screws moving outward is progressively shortened and this is done to effect higher strength in the retention means by transferring a portion of the total load from the blade material to the longer screws which results in a lower mean tensile stress in the blade material at the cross section where the area of the blade material has been reduced further by the drilled holes at said cross section. This is analogous to the common practice in the design of a triple riveted butt joint wherein the spacing of the outer row of rivets is greater than that of the adjacent row.

Tension loads from the blade 30 are transmitted to the screws 25 by means of shear stress in the wood, and the screws are so designed that the strength of the screw in shear in the wood is substantially equal to or exceeds the tensile strength of the screw. For example, a screw having a root diameter of one-fourth inch and an outside diameter of five-sixteenths of an inch can carry about 6,000 lbs. load for an overall length of thread of three inches in a material having a shear strength of approximately 2,000 lbs. per square inch, which is approximately the ultimate strength of such a screw in tension when made from a material having an ultimate strength of 125,000 lbs. per square inch. It is thus seen that it is easily possible by means of a large number of screws passing into the blade shank to develop, by shear stress in the wood, loads in the screws 25 which will substantially equal the ultimate tensile strength of the blade shank, and actual tests have shown that the efficiency of the joint, determined as the ratio of the strength in shear of the bolts in the wood, to the ultimate tensile strength of the net section of the blade has consistently fallen within the neighborhood of 100%, and in numerous tests the blades have failed in tension rather than by shearing out of the screws.

It is important that sufficient radial pressure be exerted on the blade shank to prevent any local cracking of the blade shank due to side components of force from the screw threads which would otherwise tend to produce radial stresses on the blade shank, and failure from this cause is effectively prevented by pressing the blade shank into the ferrule socket with a press fit of about five one-thousandths of an inch. This press fit also insures that even at low temperatures the blade shank will be in sufficient contact with the ferrule to transmit bending stresses directly from the blade to the ferrule so that the screws 25 are relieved of any duty of transmitting any other than tensile stresses from the blade. The provision of making the screws 25 adjacent the center of the blade shank with a longer overall thread length and progressively decreasing the thread length of the screws located at points radially outward, insures that a maximum amount of tensile stress from the blade will be transmitted through the wood adjacent the center of the blade shank at a point where bending stresses are low, and this protects the blade against failure from fatigue loading which is always most severe at the outer fibres where alternating stresses are at a maximum. In this regard it will be further noted by reference to Figure 1 that ample material is provided between the outermost row of screws 25 and the periphery of the blade shank so that the material in the shank subjected to heavy bending stresses is not required to carry shear load, and further the reduction of area of the net section of the blade shank is positioned at a point where its effect on bending stresses will be a minimum.

By means of the novel blade retaining means such as contemplated by the invention, it becomes possible to reduce the shank diameter of wood blades so that such blades can be employed to replace metal blades in the various adjustable pitch, controllable pitch and automatic variable pitch propellers now so widely employed in the art. It will be further noted that when using materials other than wood, the length of the screws 25 may be altered from that as shown in Figure 1 to take advantage of the larger shear strength available in such other materials as Compreg and those previously mentioned.

While it is entirely possible to employ taps to perform the threads in the wood or non-ferrous material of the blades, it has been found in practice best to employ self-tapping screws; but when such screws are employed in highly compressed wood such as Compreg, considerable difficulty in inserting screws of a conventional design was encountered and to alleviate the difficulties a special self-tapping screw for this purpose was developed which is illustrated in Figure 4 and seen in this figure. The screw which is generally indicated by the reference numeral 40 has a shank portion 41 having a diameter less than the maximum diameter over the threads and the threads preferably have a pitch of the order of eight threads per inch, and the thread angles are such that the rear face of the threads is inclined at an angle of 15° to the vertical and the front face of the threads is inclined at an angle of 35° to the vertical and the included angle of the threads is 50°. The threads extend substantially to the outer end of the screw, and in order to facilitate self-tapping, the screw is ground off from the root diameter on a slope of approximately 10° which leaves a tapered flat face on the screw which serves as a reamer and further allows space for the accumulation of chips, and this reamer face has been found to greatly facilitate the tapping of these screws into material such as compressed wood. The screws such as illustrated in Figure 4 form no part of the present invention, but forms the subject matter of copending application Serial Number 483,007 filed April 14, 1943 in the name of Clifford R. Gaskell, now U. S. Patent No. 2,350,346 granted June 6, 1944.

The application of the invention to a conventional two-blade adjustable pitch propeller is illustrated in Figures 5 and 6 and referring to Figure 5 the propeller hub *1a* is of well-known type, split along the longitudinal axis of the propeller blades and adapted to be held in assembled relation by means of external clamps not shown. The hub is counterbored as at 50 to provide a socket for receiving the shank 31 of the propeller blade 30, which may be for example, made of material similar to that as noted with respect to Fig. 1. The hub is further counterbored as at 52 and has a thrust flange 53 formed by the upper wall of the counterbore 52. A plate member 22 similar to that of Figure 1 is housed within the counterbore 52 and bears against the thrust face 53 to transmit the propeller blade tension stresses into the propeller hub. The plate 22 has integrally formed therewith a short ferrule *10a* into which a necked down portion *31a* of the propeller shank 31 is pressed, the ferrule serving to prevent radial fracture of the propeller blade shank due to side stresses from the screw threads as described with reference to Figure 1. The plate 22 is secured in abutting relation to the end face 32 of the propeller blade 30 by screws 25 similar to blade retention means described with reference to Figure 1 and the screws being arranged in concentric circles as noted in Figure 6. Balancing holes 55 are provided for securing vertical balance of the blades and a similar centrally located balancing hole 56 is provided for securing horizontal balance of the respective blades. Upon assembly the blade shank is pressed into the ferrule *10a* and the screws 25 driven into the blade shank and the two halves of the hub are then assembled around the blades and clamped by means not shown, the blades being adjusted about their longitudinal axis to obtain the desired blade angle prior to final clamping, the ferrule *10a* and plate 22 rotating as a unit with the blade during pitch adjustment. The transmission of stresses from the blade through the screws 25 and plate 22 to the hub *1a* is identical to the functioning of the blade retention described with respect to Figure 1.

Figure 7 shows a propeller hub and blade retaining means substantially identical with that previously described with respect to Figure 1, and differing therefrom only in that the airfoil section of the propeller blade 30 is retained substantially to the upper portion of the blade ferrule 10 which permits the blade portion adjacent the hub to assist in engine cooling, this construction of course being only desirable where cowling clearances permit.

Figures 8 and 9 illustrate the application of the invention to retaining aluminum or magnesium alloy blades in a conventional hub structure similar for example to that employed in conjunction with the Curtiss electric variable pitch propeller, and in this construction a ferrule 60 is counterbored at its outer end as at 61 to provide a socket for receiving the inner end of the shank 62 of a propeller blade 63 made from aluminum alloy. The ferrule 60 is internally threaded as at 64 to receive an externally threaded plate member 65 which is threadably apertured as at 66 to receive a plurality of screws 67 equally spaced on a circle as seen in Figure 9, the screws 67 being threaded into tapped holes 68 which extend parallel to the longitudinal axis of the propeller blade 63. The screws 67 when tightened securely clamp the blade root into the socket 61 and transmit all tension stresses from the blade into the plate member 65 from whence they are transmitted into the ferrule 60. Plate member 65 is provided with a center bore 69 through which is passed a long retaining screw 70 threaded at its outer end into a tapped hole 71 in the propeller blade shank and provided with an enlarged head 72 on its inner end which seats in a counterbore 73 of an annular flange member 75 which is threaded externally as at 74 into a complementary internally threaded portion 76 of the ferrule 60. The member 75 is formed over a sector thereof with gear teeth 78 adapted to mesh with a bull gear, not shown, through which pitch adjustment of the propeller blades is accomplished. The flange member 75 is provided with a thrust face 79 adapted to engage the inner end of a thrust bearing assembly, not shown, which surrounds the ferrule 60 and transmits stresses into the hub structure, not shown.

Except for the difference in material, the design of the blade retention means of Figures 8 and 9 is similar to that of the previously described embodiments and has the advantage that it is not necessary to form collars, threads, or the like on the periphery of the blade shank in order to secure the blades into the propeller hub structure, which is a decided advantage in that it eliminates the possibility of stress concentrations at the outermost fibres of the blade shank and further eliminates the necessity for employing split thrust bearing assemblies as heretofore commonly employed in the art.

It will be apparent from consideration of our invention that the novel feature of the same is characterized by the employment of a plurality of screws extending into the blade shank on lines substantially parallel to the longitudinal axis of the blade, which screws are adapted to transmit tension stresses from the blade by shear into a plate member or the like from whence the stresses are transmitted into the hub structure, the major portion of the bending loads on the propeller blades being adapted to be directly transmitted from the blade shank to a ferrule or socket surrounding the periphery of the shank, and the retaining screws being so positioned that ample material to carry bending stress is provided between the blade retaining screws and the ferrule or blade socket. The invention is further characterized by the fact that the arrangement of the blade retaining screws is such that a substantial percentage of the tensile stresses on the blade is transmitted into the hub structure through material adjacent the center portion of the blade shank, which material is subjected to lower alternating stresses, also the provision for variation in depths that the drilled holes and screws extend into the blade shank results in low mean stresses in the blade material at the sections having cross-sectional areas reduced by the drilled holes.

While the invention has been illustrated as employing screws of the same diameter, it is obvious that the stress distribution can be varied by varying the size of the screws and the spacing of the screws as well as by varying the length of the screws. For purposes of design it is preferable that an optimum size of screw be employed such that shear stress may be developed by the screws in the blade material approaching or exceeding the tensile strength of the screws, and we have found that screws having a diameter of one-fourth of an inch over the threads is satisfactory for general use in wood, the screw material being such that tensile stresses of 160,000 to 180,000 lbs. per square inch may be developed. It is however entirely possible to use larger diameter screws adjacent the center of the hub shank and smaller diameter screws in the outer row, which makes it possible to form one or more of such large diameter screws as hollow screws which may be plugged with lead for balancing purposes. It is further obvious that the screws may be inclined inward or outward at a slight angle if desired without departing from the spirit of the invention.

While preferred embodiments of the invention have been illustrated and described, other variations and changes therein will become apparent to those skilled in the art as falling within the scope of the invention as defined in the appended claims.

We claim:

1. Means for anchoring an individual non-ferrous propeller blade into a propeller hub having a blade receiving socket, comprising the combination with said blade and hub socket, of a ferrule secured in said hub socket so as to transmit loads to the propeller blade hub, said propeller blade having a shank adapted to be tightly received in said ferrule so as to transmit substantially all of the bending loads on the propeller blade to the ferrule, a transverse plate element associated with said ferrule radially inwardly of the outermost portion of said ferrule and abutting the blade shank, said plate element being adapted to transmit tensile stresses from the blade to said ferrule, and a plurality of threaded fastening elements extending into the propeller blade shank along lines substantially parallel with the longitudinal axis of the propeller blade, said fastening elements interconnecting said plate element and said propeller blade shank and being the sole means retaining the blade shank in the ferrule and for transmitting tension loads on said blade to said plate, said fastening elements each having threaded engagement with said propeller blade shank for a substantial length of said fastening element, said fastening elements being of sufficient length to transmit substantially all the tension loads on the blade to said fastening elements.

2. Means for retaining a non-ferrous propeller blade in a propeller hub having a blade receiving socket, comprising in combination with said blade, a transverse plate member arranged in said hub socket and abutting the blade and adapted to transmit tension loads to the hub, said propeller blade having a shank adapted to be received in said socket, means for transmitting substantially all of the bending stresses from said blade shank to said hub structure, a plurality of threaded fastening elements extending into the propeller blade shank along lines substantially parallel with the longitudinal axis of the propeller blade, said fastening elements interconnecting said plate element and said propeller blade shank and being the sole means for retaining the blade in the hub socket and for transmitting tension loads on said blade to said plate, said fastening elements each having threaded engagement with said propeller blade shank for a substantial length of said fastening element, said fastening elements being of sufficient length to transmit substantially all the tension loads on the blade to said fastening elements.

3. The structure as claimed in claim 2, in which the propeller blade shank has an outer marginal portion of its transverse end face in direct contact with said plate member with an initial clearance between the portion of said end face adjacent said fastening elements and said plate member, preloading of said fastening elements deforming said blade shank until the entire end face of said blade shank is in contact with said plate member.

4. The structure as claimed in claim 2 wherein the fastening elements adjacent the central longitudinal axis of the blade shank are longer than the fastening elements positioned radially outward therefrom, whereby a substantial portion of the tension load on the blade is transmitted through fastening elements positioned adjacent said central longitudinal axis of the blade shank.

5. The structure as claimed in claim 2, in which the propeller hub is formed of complementary halves adapted to be clamped together along a radial plane containing the propeller blade axes, an annular shoulder within said hub forming a thrust abutment and having a diameter greater than the diameter of the blade receiving socket and positioned at the radially inward end thereof and concentric with the blade shank axis, said transverse plate member being in the form of an adjustably rotatable disc engaging said thrust abutment and having a plurality of apertures for passage of said threaded fastening elements therethrough, said fastening elements being operatively connected to said disc for transmission of all tension loads on the blade thereto and the transverse end face of the blade shank engaging said disc, and a metal ring pressed onto the blade shank to prevent radial failure of the blade shank from radial stresses imposed by tension loads on the said threaded fastening means.

CLIFFORD R. GASKELL.
MARVIN C. GREEN.